United States Patent Office 3,224,980
Patented Dec. 21, 1965

3,224,980
CATALYST PREPARATION AND COMPOSITION
Harold E. Swift, Gibsonia, Pa., assignor to Gulf Research & Development Company, Pittsburgh, Pa., a corporation of Delaware
No Drawing. Filed Apr. 20, 1964, Ser. No. 361,233
18 Claims. (Cl. 252—429)

This invention relates to a process for preparing a solid complex and to said complex as a new composition of matter.

A titanium tetrahalide, such as titanium tetrachloride, can be reacted with a dialkylaluminum halide, such as diethylaluminum chloride, to form an alkylaluminum dihalide, such as ethylaluminum dichloride, a titanium trihalide, such as titanium trichloride, and alkyl radicals, such as ethyl, which readily disproportionate to an olefin and a hydrocarbon, such as ethylene and ethane, respectively. When the reaction is carried out in a solvent, such as hexane, the titanium trihalide obtained precipitates out of solution in the form of a fine precipitate. Depending upon the reaction conditions employed alpha-, beta- or gamma titanium trichlorides are obtained. The mixture of titanium trihalide and alkylaluminum dihalide so produced can be employed as a catalyst for the polymerization of olefins, such as ethylene, propylene, etc. Unfortunately, this mixture is very reactive with air or moisture and great care must be exercised in its preparation and subsequent use.

I have found that I can produce a solid complex by reacting a titanium tetrahalide with a dialkylaluminum halide in the presence of a selected amount of cyclohexane, which complex can be employed as a polymerization catalyst and is far less reactive to air and moisture than the prior art catalyst systm referred to above wherein the titanium trihalide is present therein in the form of fine precipitates of titanium trihalides and/or dihalides.

One of the reactants required to produce the solid complex of this invention is a titanium tetrahalide, such as titanium tetrachloride. Titanium tetrachloride is preferred. The second reactant required is a dialkylaluminum halide wherein the alkyl portion thereof has from one to six carbon atoms, preferably from two to three carbon atoms. Examples of such alkyl substituents that can be present are methyl, ethyl, propyl, hexyl, etc. The halide portion of said dialkylaluminum halide can be chlorine, bromine or iodine. Of these chlorine is preferred. Examples of dialkylaluminum halides that can be employed include diethylaluminum chloride, diethylaluminum bromide, etc. The preferred compound is diethylaluminum chloride. Neither alkylaluminum dihalides, such as ethylaluminum dichloride, nor a trialkylaluminum, such as triethylaluminum can be employed in place of the dialkylaluminum halide in the process of this invention to produce the new solid complex defined herein. The reaction of the titanium tetrahalide with the dialkylaluminum halide must be effected in the presence of cyclohexane.

Not only must the new solid complex of this invention be obtained as a result of the reaction of a titanium tetrahalide with a dialkylaluminun halide in the presence of cyclohexane but the proportions of each that must be present in the reaction system are critical. The solid complex can only be obtained by employing the titanium tetrahalide and the dialkylaluminum halide in a molar ratio of about 1.3:1 to about 2:1, preferably about 1.3:1 to about 1.7:1. Best results are obtained when the molar ratio of titanium tetrahalide to dialkylaluminum halide is about 1.5:1. The molar ratio of cyclohexane to the combined molar amounts of titanium tetrahalide and dialkylaluminum halide must be about 32.20:1 to about 1.75:1, preferably about 12.87:1 to about 6.44:1. When the reaction defined herein is carried out using titanium tetrahalides, dialkylaluminum halides and cyclohexane outside of said ranges a solid complex is not obtained but instead a two-phase system comprising a liquid having a titanium compound dispersed therein. The latter system is undesirable, since it is highly reactive with air and water.

The reaction conditions are not critical. Since titanium tetrahalides and dialkylaluminum halides are highly reactive in air and water, the reaction is carired out in an inert system, for example, in a nitrogen atmosphere. In carrying out the reaction, therefore, the reactor is purged and an inert gas is introduced therein. Cyclohexane is then added to the reactor, and this is followed by the introduction therein of the titanium tetrahalide and the dialkylaluminum halide. The temperatures required can be, for example, from about 10° to about 50° C., preferably about 20° to about 30° C., and the pressure from about 15 to about 75 pounds per square inch gauge, preferably about 15 to about 30 pounds per square inch gauge. The reaction time can be from about five minutes to about 24 hours. When the preferred amounts of materials are employed a reaction time of about five to about 10 minutes will suffice. It is important that the mixture be allowed to set during the time indicated without agitation.

At the end of the reaction period the reaction product obtained is a solid material brown in color with a texture similar to that of hard chocolate candy. The solid material is far less reactive than the fine powdery material produced in the prior art procedures wherein a titanium tetrahalide is reacted with a dialkylaluminum halide in the presence of a large amount of solvent. On exposure to air a white coating slowly forms over the surface of the solid. The solid can be easily handled and, in fact, when the preferred amounts of titanium tetrahalide, dialkylaluminum halide and cyclohexane are employed in its preparation the solid can be easily held in one's hand. Refluxing the solid for two hours in benzene, normal heptane or cyclohexane did not result in dispersioin or decomposition thereof.

While I am not certain I believe that reaction of titanium tetrahalide with dialkylaluminum halide in the presence of cyclohexane, as defined herein, results in a solid complex composed of a titanium trihalide, an alkylaluminum diahalide and cyclohexane. The formation of the solid complex can not be explained by the usual means of compound formation, that is, by ionic, covalent or coordinate covalent bonding. The formation of the solid complex can be explained, however, by assuming that an inclusion-type complex has been formed. Inclusion compounds are formed due to the ability of one compound or molecule to unite spatially with another and the only forces of interaction are the weak Van der Waals type and possibly hydrogen bonding. The spaces into which the "guest" molecule can fit may be in the form of isolated cages, channels or layers, and the fit is almost always dependent on steric factors. I believe that in the instant case the titanium trihalide and the alkylaluminum dihalide combine spatially to form a cage, channel or layer wherein the cyclohexane is securely positioned or held.

While I believe that the solid complex is composed of a titanium trihalide, an alkylaluminum dihalide and cyclohexane the titanium trihalide is not similar to the titanium trihalides of the prior art. Thus I have subjected the new solid complexes prepared herein to X-ray diffraction studies with a Norelco X-ray Diffractometer (North American Philips Corporation, 12045B3 Type Number) using CuK alpha radiation, a nickel filter and a camera having a radius of 57.3 millimeters. The X-ray diffraction pattern of the solid complex of this invention was compared with the X-ray diffraction patterns of alpha-, beta- and gamma titanium trichlorides and was found to be very different than other known forms of titanium trichloride. On reacting titanium tetrachloride with an aluminum alkyl, such as diethylaluminum choride in a solvent, such as hexane, the precipitate that is formed exhibits an X-ray diffraction pattern similar to that exhibited by the known forms of titanium trichloride.

The invention defined herein can further be illustrated by the following.

EXAMPLE I

Samples were prepared wherein titanium tetrachloride was reacted with an aluminum compound in the presence of various solvents therefor. In each instance test tubes were baked in an oven at 130° C. for at least 24 hours and then transferred to a nitrogen-controlled dry box wherein the solvent was added and the tubes then sealed with rubber syringe cups. The samples were then taken from the dry box and the titanium compound and aluminum compound were added by means of a hypodermic syringe and needle. The reactions were then permitted to proceed at a temperature of 26° C. and 15 pounds per square inch gauge. The results obtained are tabulated below.

of 35° C. After about 30 minutes almost all of the liquid monomer was converted to a white rubbery polymer. After a day the polymer turned yellow. The infrared spectrum of the polymer gave a strong absorption bond at 955 cm.$^{-1}$, which is probably due to the trans-RCH=CHR-type linkage.

EXAMPLE III

To 75 milliliters of 1-hexene in a 125 milliliter reaction flask fitted with a reflux condenser there was added three grams of the catalyst prepared in Run No. 3. The reaction was carried out in air at a pressure of 15 pounds per square inch gauge. The reaction flask became very hot on stirring, indicating that a reaction was taking place. After 10 minutes the reaction was stopped by adding water thereto. The aqueous phase was separated from the organic phase and the unreacted monomer was then evaporated off at reduced pressure, leaving a colorless oil. The infrared spectrum of the oil indicated that RCH=HC$_2$, R$_2$C=CH$_2$ and trans-RCH=CHR-type olefins were present. A mass spectrophotometric analysis of the oil gave evidence of a wide variety of materials from very low molecular weight to the highest molecular weight observed which was hexene hexamer. The intrinsic viscosity was obtained at 37.8° C. in normal heptane and was found to be 0.033. The oil had a viscosity index of 133.

*Table I*

| Run No. | Solvent | Volume c.c. | Mols/10² | Volume TiCl₄, c.c. | Mols/10³ | Aluminum Compound | Volume Aluminum Compound, c.c. | Mols/10³ | Reaction Time, Hours | Mols of Solvent/ Mols of Combined Ziegler Reagents | Mols of TiCl4/ Mols of Aluminum Compound | Results |
|---|---|---|---|---|---|---|---|---|---|---|---|---|
| 1 | Cyclohexane | 1.0 | 0.925 | 0.3 | 2.73 | Al(C₂H₅)₂Cl | 0.2 | 1.59 | 0.08 | 2.14 | 1.72 | Solid, reacts with air to give off smoke. |
| 2 | do | 2.0 | 1.85 | 0.3 | 2.73 | Al(C₂H₅)₂Cl | 0.2 | 1.59 | 0.08 | 4.28 | 1.72 | Solid, reacts with air to give off some smoke. |
| 3 | do | 3.0 | 2.78 | 0.3 | 2.73 | Al(C₂H₅)₂Cl | 0.2 | 1.59 | 0.08 | 6.44 | 1.72 | Solid, very small amount of smoke initially. |
| 4 | do | 5.0 | 4.63 | 0.3 | 2.73 | Al(C₂H₅)₂Cl | 0.2 | 1.59 | 0.08 | 10.70 | 1.72 | Do. |
| 5 | do | 8.0 | 7.41 | 0.3 | 2.73 | Al(C₂H₅)₂Cl | 0.2 | 1.59 | 1.0 | 17.18 | 1.72 | Do. |
| 6 | do | 12.0 | 11.12 | 0.3 | 2.73 | Al(C₂H₅)₂Cl | 0.2 | 1.59 | 24 | 25.70 | 1.72 | Do. |
| 7 | do | 15.0 | 13.9 | 0.3 | 2.73 | Al(C₂H₅)₂Cl | 0.2 | 1.59 | 24 | 32.20 | 1.72 | Do. |
| 8 | do | 16.0 | 14.83 | 0.3 | 2.73 | Al(C₂H₅)₂Cl | 0.2 | 1.59 | 24 | 34.30 | 1.72 | Solid and liquid phase. |
| 9 | do | 3.0 | 2.78 | 0.7 | 6.37 | Al(C₂H₅)₂Cl | 0.2 | 1.59 | 24 | 3.50 | 4.00 | Do. |
| 10 | do | 3.0 | 2.78 | 0.3 | 2.73 | Al(C₂H₅)₂Cl | 0.7 | 5.56 | 24 | 3.36 | 0.48 | Do. |
| 11 | Methylcyclohexane | 3.0 | 2.35 | 0.3 | 2.73 | Al(C₂H₅)₂Cl | 0.2 | 1.59 | 24 | 5.43 | 1.72 | Do. |
| 12 | Benzene | 2.5 | 2.81 | 0.3 | 2.73 | Al(C₂H₅)₂Cl | 0.2 | 1.59 | 24 | 6.50 | 1.72 | Do. |
| 13 | Toluene | 3.0 | 2.82 | 0.3 | 2.73 | Al(C₂H₅)₂Cl | 0.2 | 1.59 | 24 | 6.53 | 1.72 | Do. |
| 14 | Normal Heptane | 3.0 | 2.05 | 0.3 | 2.73 | Al(C₂H₅)₂Cl | 0.2 | 1.59 | 24 | 4.75 | 1.72 | Do. |
| 15 | do | 3.0 | 2.30 | 0.3 | 2.73 | Al(C₂H₅)₂Cl | 0.2 | 1.59 | 24 | 5.32 | 1.72 | Do. |
| 16 | Cyclopentane | 2.5 | 2.68 | 0.3 | 2.73 | Al(C₂H₅)₂Cl | 0.2 | 1.59 | 24 | 6.20 | 1.72 | Do. |
| 17 | Cyclohexane | 3.0 | 2.78 | 0.3 | 2.73 | Al(C₂H₅)₃ | 0.2 | 1.16 | 24 | 7.14 | 2.35 | Do. |

The results tabulated above in Table I clearly illustrate the criticality of the components required in the reactor system and the proportions thereof. In each instance wherein a solid and liquid phase were obtained a fine, solid precipitate, black or brown, resulted that was highly reactive with air or moisture. Although the solid complex obtained in Runs Nos. 1 and 2 was somewhat more reactive with air than those obtained using the preferred amounts of cyclohexane, they were, nevertheless, far less reactive than the fine precipitates obtained herein or the fine precipitates of the prior art.

The solid complex of this invention functions as cationic-type catalyst when used alone, even after handling in air, for the polymerization of C$_5$ and higher alpha olefins, diolefins and other monomers that are polymerized by cationic type catalysts. This is shown below.

EXAMPLE II

To a 500 milliliter reaction flask fitted with a reflux condenser there was added three grams of the catalyst prepared from Run No. 3 and 200 cc. of 1,3-pentadiene. The reaction was carried out in a nitrogen atmosphere at 15 pounds per square inch gauge and at a temperature Obviously, many modifications and variations of the invention, as hereinabove set forth, can be made without departing from the spirit and scope thereof, and therefore only such limitations should be imposed as are indicated in the appended claims.

I claim:

1. A process for producing a solid complex which consists essentially of reacting a titanium tetrahalide with a dialkylaluminum halide, wherein the alkyl portion thereof has from one to six carbon atoms, in the presence of cyclohexane, the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1.

2. A process for producing a solid complex which consists essentially of reacting a titanium tetrahalide with a dialkylaluminum halide, wherein the alkyl portion thereof has from one to six carbon atoms, in the presence of cyclohexane, the molar ratio of said titanium compound to said aluminum compound being from about 1.3:1 to about 1.7:1 and the molar ratio of cyclohexane relative to the combined moles of said titanium compound and said aluminum compound being from about 12.87:1 to about 6.44:1.

3. A process for producing a solid complex which consists essentially of reacting a titanium tetrahalide with a dialkylaluminum halide, wherein the alkyl portion thereof has from one to six carbon atoms, in the presence of cyclohexane, the molar ratio of said titanium compound to said aluminum compound being about 1.5:1 an the molar ratio of cyclohexane relative to the combined moles of said titanium compound and said aluminum compound being from about 12.87:1 to about 6.44:1.

4. A process for producing a solid complex which consists essentially of reacting a titanium tetrahalide with a dialkylaluminum halide, wherein the alkyl portion thereof has from one to six carbon atoms, in the presence of cyclohexane at a temperature of about 10° to about 50° C., the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1.

5. A process for producing a solid complex which consists essentially of reacting titanium tetrachloride with dialkylaluminum chloride, wherein the alkyl portion thereof has from one to six carbon atoms, in the presence of cyclohexane, the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1.

6. A process for producing a solid complex which consists essentially of reacting titanium tetrachloride with diethylaluminum chloride in the presence of cyclohexane, the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.7:1.

7. A process for producing a solid complex which consists essentially of reacting titanium tetrachloride with dialkylaluminum chloride, wherein the alkyl portion thereof has from one to six carbon atoms, in the presence of cyclohexane, the molar ratio of said titanium compound to said aluminum compound being from about 1.3:1 to about 1.7:1 and the molar ratio of cyclohexane relative to the combined moles of said titanium compound and said aluminum compound being from about 12.87:1 to about 6.44:1.

8. A process for producing a solid complex which consists essentially of reacting titanium tetrachloride with dialkylaluminum chloride, wherein the alkyl portion thereof has from one to six carbon atoms, in the presence of cyclohexane, the molar ratio of said titanium compound to said aluminum compound being about 1.5:1 and the molar ratio of cyclohexane relative to the combined moles of said titanium compound and said aluminum compound being from about 12.87:1 to about 6.44:1.

9. A process for producing a solid complex which consists essentially of reacting titanium tetrachloride with dialkylaluminum chloride, wherein the alkyl portion thereof has from one to six carbon atoms, in the presence of cyclohexane at a temperature of about 10° to about 50° C., the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1.

10. The solid complex resulting from the process of claim 1.

11. The solid complex resulting from the process of claim 2.

12. The solid complex resulting from the process of claim 3.

13. The solid complex resulting from the process of claim 4.

14. The solid complex resulting from the process of claim 5.

15. The solid complex resulting from the process of claim 6.

16. The solid complex resulting from the process of claim 7.

17. The solid complex resulting from the process of claim 8.

18. The solid complex resulting from the process of claim 9.

References Cited by the Examiner

UNITED STATES PATENTS 3,058,963  10/1962  Vandenberg _____ 252—429

TOBIAS E. LEVOW, *Primary Examiner.*